US012804461B2

(12) United States Patent
Fan et al.

(10) Patent No.: US 12,804,461 B2
(45) Date of Patent: Nov. 17, 2026

(54) INFORMATION INDICATION METHOD AND APPARATUS

(71) Applicant: HUAWEI TECHNOLOGIES CO., LTD., Shenzhen (CN)

(72) Inventors: Qiang Fan, Shanghai (CN); Jingcong Sun, Shenzhen (CN); Xiaoying Xu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 330 days.

(21) Appl. No.: 18/423,942

(22) Filed: Jan. 26, 2024

(65) Prior Publication Data

US 2024/0163721 A1 May 16, 2024

Related U.S. Application Data

(63) Continuation of application No. PCT/CN2022/106835, filed on Jul. 20, 2022.

(30) Foreign Application Priority Data

Jul. 28, 2021 (CN) ......................... 202110854277.0

(51) Int. Cl.
*H04W 28/06* (2009.01)
*H04L 69/22* (2022.01)

(52) U.S. Cl.
CPC ........... *H04W 28/065* (2013.01); *H04L 69/22* (2013.01)

(58) Field of Classification Search
CPC ...... H04L 69/22; H04L 69/04; H04W 28/065; H04W 28/06; H04W 76/12; H04W 8/24
See application file for complete search history.

(56) References Cited

U.S. PATENT DOCUMENTS

2019/0116521 A1* 4/2019 Qiao ..................... H04W 28/06
2023/0180027 A1* 6/2023 Xu ............................ H04L 1/16 370/329
2024/0163721 A1* 5/2024 Fan ......................... H04L 69/22

FOREIGN PATENT DOCUMENTS

WO WO-2021026939 A1 * 2/2021 ............. H04L 69/04
WO WO-2021029369 A1 * 2/2021 ............. H04L 69/04
(Continued)

OTHER PUBLICATIONS

Mediatek Inc: "[AT109e][034][IIOT] EHC Phase 2 summary", 3GPP Draft; R2-2002296, 3rd Generation Partnership Project (3GPP), Mobile Competence Centre; 650, Route Des Lucioles; F-06921 Sophia-Antipolis Cedex; France, vol. RAN WG2, No. Online; Feb. 24, 2020-Mar. 6, 2020, Mar. 11, 2020, XP052357313, total 16 pages.

(Continued)

*Primary Examiner* — Phong La
(74) *Attorney, Agent, or Firm* — HAUPTMAN HAM, LLP

(57) ABSTRACT

Embodiments of this application provide an information indication method and apparatus. The method includes: A CP indicates, to a UP by using first information, a maximum number of EHC contexts that can be established by the UP for UE, a DRB of the UE, or a PDU session of the UE in a downlink direction, so that the UP can establish a proper number of EHC contexts for the UE, the DRB of the UE, or the PDU session of the UE in the downlink direction based on the maximum number. This resolves a problem that a UP in an access network device in a split architecture cannot establish a proper number of EHC contexts for the UE because the UP does not know a capability of the UE.

16 Claims, 4 Drawing Sheets

(56) References Cited

FOREIGN PATENT DOCUMENTS

| | | | | |
|---|---|---|---|---|
| WO | WO-2021062827 A1 * | 4/2021 | ............ | H04W 80/02 |
| WO | WO-2021124571 A1 * | 6/2021 | ............ | H04W 16/32 |

OTHER PUBLICATIONS

"3rd Generation Partnership Project; Technical Specification Group Radio Access Network; NG-RAN; E1 Application Protocol (E1AP) (Release 16)", 3GPP Standard; Technical Specification; 3GPP TS 38.463, 3rd Generation Partnership Project (3GPP), Mobile Competence Centre; 650, route des Lucioles ; F-06921 Sophia-Antipolis Cedex; France, vol. RAN WG3, No. V16.6.0, Aug. 25, 2021 (Aug. 25, 2021), pp. 1-239, XP052056352.

European Search Report issued in corresponding European Application No. 22848375.6, dated Oct. 10, 2024, pp. 1-8.

3GPP TSG-RAN WG2 Meeting#109e,R2-2002296,"[ATI0ge][034][IIOT] EHC Phase 2 summary", MediaTek Inc,Feb. 24-Mar. 6, 2020,XP052357313,total 16 pages.

IEEE Std 802.3™-2018, IEEE Standard for Ethernet LAN/MAN Standards Committee of the, IEEE Computer Society, Approved Jun. 14, 2018,total 5600 pages.

3GPP TSG-RAN WG3 Meeting #113-e,R3-213356,"Enhancement for EHC contexts",Huawei, China Unicom,Aug. 16-26, 2021,total 5 pages.

3GPP TS 38.463 V16.6.0 (Jul. 2021),3rd Generation Partnership Project;Technical Specification Group Radio Access Network;NG-RAN;E1 Application Protocol (E1AP)(Release 16), XP052056352,total 239 pages.

IEEE Std 802.1Q™-2018, "IEEE Standard for Local and Metropolitan Area Networks-Bridges and Bridged Networks", May 2018, total 1993 pages.

3GPP TSG-RAN WG3 Meeting #113-e,R3-213357,"Restricting the number of DL EHC contexts—Option 1",Huawei, China Unicom,Aug. 16-26, 2021,total 9 pages.

3GPP TS 38.331 V16.5.0 (Jun. 2021),3rd Generation Partnership Project;Technical Specification Group Radio Access Network;NR-;Radio Resource Control (RRC) protocol specification(Release 16),total 956 pages.

3GPP TSG-RAN WG3 Meeting #113-e,R3-213358,"Restricting the number of DL EHC contexts—Option 2", E-meeting, Aug. 16-26, 2021,Huawei, China Unicom,total 15 pages.

3GPP TS 38.323 V16.4.0 (Jun. 2021),3rd Generation Partnership Project;Technical Specification Group Radio Access Network;NR;Packet Data Convergence Protocol (PDCP) specification(Release 16),total 40 pages.

3GPP TSG-RAN WG3 #112-e,R3-212758,"Summary of Offline Discussion on Correction on missing IE of EHC", Online, May 17-28, 2021, Huawei (moderator),total 4 pages.

3GPP TS 38.306 V16.5.0 (Jun. 2021),3rd Generation Partnership Project;Technical Specification Group Radio Access Network;NR;User Equipment (UE) radio access capabilities(Release 16),total 135 pages.

Extended European Search Report issued in corresponding European Application No. 22848375.6, dated Oct. 10, 2024, pp. 1-9.

International Search Report issued in corresponding International Application No. PCT/CN2022/106835, dated Oct. 9, 2022, pp. 1-9.

3GPP TS 38.463 V16.2.0 (Jul. 2020), 3rd Generation Partnership Project; Technical Specification Group Radio Access Network; NG-RAN; E1 Application Protocol (E1AP)(Release 16), total 230 pages.

Examination Report issued in IN202447006382 dated Mar. 19, 2026.

* cited by examiner

INFORMATION INDICATION METHOD AND APPARATUS

CROSS-REFERENCE TO RELATED APPLICATIONS

This application is a continuation of International Application No. PCT/CN2022/106835, filed on Jul. 20, 2022, which claims priority to Chinese Patent Application No. 202110854277.0, filed on Jul. 28, 2021. The disclosures of the aforementioned applications are hereby incorporated by reference in their entireties.

TECHNICAL FIELD

This application relates to the communication field, and more specifically, to an information indication method and apparatus.

BACKGROUND

With development of communication technologies, an access network device may establish an Ethernet header compression (EHC) context for a terminal.

Currently, a central unit (CU) in an access network device that uses a split architecture may be split into a CU-control plane (CP) and a CU-user plane (UP). The CU-UP may be configured to establish an EHC context for the terminal. However, the CU-UP does not know a capability of user equipment (UE). Therefore, how to establish a proper number of EHC contexts for the UE becomes an urgent technical problem to be resolved.

SUMMARY

Embodiments of this application provide an information indication method and apparatus, to establish a proper number of EHC contexts for a terminal.

According to a first aspect, this application provides an information indication method. The method may be performed by a UP, or may be performed by a component (for example, a chip or a chip system) configured in a UP, or may be implemented by a logical module or software that can implement all or some of UP functions. This is not limited in this application. For ease of understanding and description, the following describes the method provided in this application by using interaction between a UP and a CP as an example.

For example, the method includes: A user plane UP in a central unit CU receives first information from a control plane CP, where the first information indicates a maximum number of Ethernet header compression EHC contexts that can be established for a first target in a downlink direction, the first target includes user equipment UE, a first data radio bearer (DRB) of the UE, or a first protocol data unit (PDU) session of the UE, the first DRB is a DRB maintained by the UP, and the first PDU session is a PDU session maintained by the UP; and the UP establishes the EHC context for the first target in the downlink direction based on the first information.

Based on the foregoing technical content, the CP indicates, to the UP by using the first information, the maximum number of EHC contexts that can be established by the UP for the UE, the DRB of the UE, or the PDU session of the UE in the downlink direction, so that the UP can establish a proper number of EHC contexts for the UE, the DRB of the UE, or the PDU session of the UE in the downlink direction based on the maximum number. This resolves a problem that a UP in an access network device in a split architecture cannot establish a proper number of EHC contexts for the UE because the UP does not know a capability of the UE.

With reference to the first aspect, in some possible implementations of the first aspect, a number of EHC contexts established by the UP for the first target in the downlink direction is not greater than the maximum number indicated by the first information.

The number of EHC contexts established by the UP for the first target in the downlink direction is limited to being not greater than the maximum number indicated by the first information, so that a case in which the capability of the UE is exceeded as the UP establishes an excessive number of EHC contexts in the downlink direction is avoided.

With reference to the first aspect, in some possible implementations of the first aspect, the first information is carried in an EHC parameters information element (IE) (which may be referred to as an information element for short).

With reference to the first aspect, in some possible implementations of the first aspect, the first target is the first PDU session of the UE, and the first information is carried in a to-be-established PDU session resource list IE.

With reference to the first aspect, in some possible implementations of the first aspect, the first information is carried in a bearer context setup request message, a bearer context modification request message, or a bearer context modification confirm message.

The first information may not need to be separately sent, and is directly carried in the bearer context setup request message, the bearer context modification request message, or the bearer context modification confirm message for sending, so that occupation of network resources is reduced.

With reference to the first aspect, in some possible implementations of the first aspect, the method further includes: The UP sends second information to the CP, where the second information is used to request to modify the maximum number of EHC contexts that can be established for the first target in the downlink direction.

The UP requests the CP to reassign, to the UP, a maximum number of EHC contexts that can be established for the first target in the downlink direction, so that the maximum number, reassigned by the CP to the UP, of EHC contexts that are established for the first target better meets an actual service requirement of the UP.

Further, the second information indicates an expected value of the maximum number requested to be modified, or the second information is used to request to modify the maximum number to a larger value, or to modify the maximum number to a smaller value.

Further, the second information may be carried in a bearer context modification required message.

The second information may not need to be separately sent, and is directly carried in the bearer context modification required message for sending, so that occupation of network resources is reduced.

According to a second aspect, this application provides an information indication method. The method may be performed by a CP, or may be performed by a component (for example, a chip or a chip system) configured in a CP, or may be implemented by a logical module or software that can implement all or some of CP functions. This is not limited in this application. For ease of understanding and description, the following describes the method provided in this application by using interaction between a UP and a CP as an example.

For example, the method includes: A control plane CP in a central unit CU generates first information, where the first information indicates a maximum number of Ethernet header compression EHC contexts that can be established for a first target in a downlink direction, the first target includes UE, a first DRB of the UE, or a first PDU session of the UE, the first DRB is a DRB maintained by a UP, and the first PDU session is a PDU session maintained by the UP; and the CP sends the first information to the UP.

Based on the foregoing technical content, the CP indicates, to the UP by using the first information, the maximum number of EHC contexts that can be established by the UP for the UE, the DRB of the UE, or the PDU session of the UE in the downlink direction, so that the UP can establish a proper number of EHC contexts for the UE, the DRB of the UE, or the PDU session of the UE in the downlink direction based on the maximum number. This resolves a problem that a UP in an access network device in a split architecture cannot establish a proper number of EHC contexts for the UE because the UP does not know a capability of the UE.

With reference to the second aspect, in some possible implementations of the second aspect, a total value of a maximum number, assigned by the CP to the UE, of EHC contexts that can be established by the UE in an uplink direction plus a maximum number, assigned by the CP to the UP, of EHC contexts that can be established by the UP for the UE in the downlink direction is not greater than a maximum number of EHC contexts supported by the UE.

A magnitude relationship between the total value of the maximum number, assigned by the CP to the UE, of EHC contexts that can be established by the UE in the uplink direction plus the maximum number, assigned by the CP to the UP, of EHC contexts that can be established by the UP for the UE in the downlink direction, and the maximum number of EHC contexts supported by the UE is limited, so that a case in which a capability of the UE is exceeded as the CP assigns an excessive number of EHC contexts is avoided.

With reference to the second aspect, in some possible implementations of the second aspect, the first information is carried in an EHC parameters IE.

With reference to the second aspect, in some possible implementations of the second aspect, the first target is the first PDU session of the UE, and the first information is carried in a to-be-established PDU session resource list IE.

With reference to the second aspect, in some possible implementations of the second aspect, the first information is carried in a bearer context setup request message, a bearer context modification request message, or a bearer context modification confirm message.

The first information may not need to be separately sent, and is directly carried in the bearer context setup request message, the bearer context modification request message, or the bearer context modification confirm message for sending, so that occupation of network resources is reduced.

With reference to the second aspect, in some possible implementations of the second aspect, the method further includes the following.

The CP receives second information from the UP, where the second information is used to request to modify the maximum number of EHC contexts that can be established for the first target in the downlink direction; and the CP modifies the first information based on the second information.

The CP receives the second information from the UP, and modifies the first information based on the second information, so that a maximum number of EHC contexts that can be established by the UP for the first target in the downlink direction and that is indicated by modified first information better meets an actual service requirement of the UP.

Further, the second information indicates an expected value of the maximum number requested to be modified, or the second information is used to request to modify the maximum number to a larger value, or to modify the maximum number to a smaller value.

Further, the second information is carried in a bearer context modification required message.

The second information may not need to be separately sent, and is directly carried in the bearer context modification required message for sending, so that occupation of network resources is reduced.

With reference to the second aspect, in some possible implementations of the second aspect, the method further includes: The CP receives third information, where the third information indicates the maximum number of EHC contexts supported by the UE.

According to a third aspect, this application provides an information indication apparatus, including a module or a unit configured to implement the method according to any one of the first aspect and the possible implementations of the first aspect. It should be understood that each module or unit may implement a corresponding function by executing a computer program.

According to a fourth aspect, this application provides an information indication apparatus, including a processor, where the processor is configured to perform the information indication method according to any one of the first aspect and the possible implementations of the first aspect.

The apparatus may further include a memory, configured to store instructions and data. The memory is coupled to the processor, and when executing the instructions stored in the memory, the processor may implement the method described in the foregoing aspects. The apparatus may further include a communication interface. The communication interface is used by the apparatus to communicate with another device. For example, the communication interface may be a transceiver, a circuit, a bus, a module, or another type of communication interface.

According to a fifth aspect, this application provides an information indication apparatus, including a module or a unit configured to implement the method according to any one of the second aspect and the possible implementations of the second aspect. It should be understood that each module or unit may implement a corresponding function by executing a computer program.

According to a sixth aspect, this application provides an information indication apparatus, including a processor, where the processor is configured to perform the information indication method according to any one of the second aspect and the possible implementations of the second aspect.

The apparatus may further include a memory, configured to store instructions and data. The memory is coupled to the processor, and when executing the instructions stored in the memory, the processor may implement the method described in the foregoing aspects. The apparatus may further include a communication interface. The communication interface is used by the apparatus to communicate with another device. For example, the communication interface may be a transceiver, a circuit, a bus, a module, or another type of communication interface.

According to a seventh aspect, this application provides an information indication system, including the apparatus according to the third aspect or the fourth aspect and the apparatus according to the fifth aspect or the sixth aspect.

According to an eighth aspect, this application provides a computer-readable storage medium, including a computer program. When the computer program is run on a computer, the computer is enabled to implement the method according to any one of the first aspect or the second aspect and the possible implementations of the first aspect or the second aspect.

According to a ninth aspect, this application provides a computer program product. The computer program product includes a computer program (which may also be referred to as code or instructions). When the computer program is run, a computer is enabled to perform the method according to any one of the first aspect or the second aspect and the possible implementations of the first aspect or the second aspect.

It should be understood that the third aspect to the ninth aspect of this application correspond to the technical solutions of the first aspect or the second aspect of this application, and beneficial effects achieved by the aspects and the corresponding feasible implementations are similar. Details are not described again.

DESCRIPTION OF EMBODIMENTS

Figure 1:
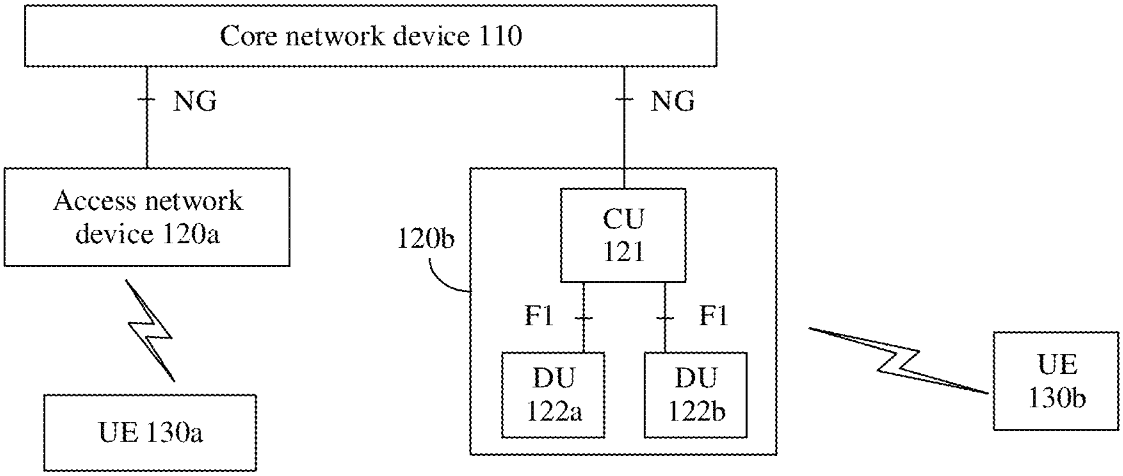
FIG. 1 is a schematic diagram of a system of an information indication method according to an embodiment of this application.

The following describes technical solutions of this application with reference to accompanying drawings.

The technical solutions provided in this application may be applied to scenarios such as an Internet of things (IOT) scenario, an industrial Internet of things (IIOT) scenario, and a vehicle to x (V2X) scenario.

It should be understood that UE in embodiments of this application may also be referred to as a terminal device, a terminal, an access terminal, a subscriber unit, a subscriber station, a mobile station, a mobile console, a remote station, a remote terminal, a mobile device, a user terminal, a wireless communication device, a user agent, or a user apparatus.

The UE may be a device that provides a voice/data connectivity for a user, for example, a handheld device or a vehicle-mounted device that has a wireless connection function. Currently, some examples of the terminal may be: a mobile phone, a tablet computer (pad), a computer (for example, a notebook computer or a palmtop computer) having a wireless transceiver function, a mobile Internet device (MID), a virtual reality (VR) device, an augmented reality (AR) device, a wireless terminal in industrial control, a wireless terminal in self driving, a wireless terminal in remote medical, a wireless terminal in a smart grid, a wireless terminal in transportation safety, a wireless terminal in a smart city, a wireless terminal in a smart home, a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a terminal device in a 5G network, a terminal device in a future evolved public land mobile network (PLMN), or the like.

The wearable device may also be referred to as a wearable intelligent device, and is a general term of wearable devices, such as glasses, gloves, watches, clothes, and shoes, that are intelligently designed and developed for daily wear by using a wearable technology. The wearable device is a portable device that is directly worn on a body or integrated into clothes or an accessory of a user. The wearable device is not only a hardware device, but also implements a powerful function through software support, data exchange, and cloud interaction. Generic wearable smart devices include full-featured and large-size devices that can implement complete or partial functions without depending on smartphones, such as smart watches or smart glasses, and devices that focus only on a type of application function and need to work with other devices such as smartphones, such as various smart bands or smart jewelry for monitoring physical signs.

In addition, the terminal device may alternatively be a terminal device in an IoT system. An IoT is an important part in future development of information technologies. A main technical feature of the IoT is to connect things to a network by using a communication technology, to implement an intelligent network for human-machine interconnection and thing-thing interconnection. IoT technologies can achieve massive connections, intensive coverage, and power saving for terminals by using, for example, a narrow band (NB) technology.

A specific form of the terminal device is not limited in this application.

It should be further understood that the access network device may be any device having a wireless transceiver function. The access network device includes but is not limited to: an evolved NodeB (eNB), a radio network controller (RNC), a NodeB (NB), a base station controller (BSC), a base transceiver station (BTS), a home base station (for example, a home evolved NodeB, or a home NodeB, HNB), a baseband unit (BBU), an access point (AP) in a wireless fidelity (Wi-Fi) system, a wireless relay node (RRN), a wireless backhaul node, a transmission point (TP), a transmission and reception point (TRP), or the like. Alternatively, the access network device may be a gNB or a transmission point (TRP or TP) in a 5G system like an NR system, may be one antenna panel or a group (including a plurality of antenna panels) of antenna panels of a base station in a 5G system, or may be a network node, for example, a baseband unit (BBU) or a distributed unit (DU), that constitutes a gNB or a transmission point.

In some deployments, the gNB may include a CU and a distributed unit (DU). The following describes an architecture of a CU-DU in detail with reference to the accompanying drawings. Detailed description of the CU-DU is omitted herein.

FIG. 1 is a schematic diagram of a system of an information indication method according to an embodiment of this application. As shown in FIG. 1, a system 100 includes a core network device 110, radio access network (RAN) devices 120*a* and 120*b* connected to the same core network (CN) device 110, a terminal 130*a* connected to the access network device 120*a*, and a terminal 130*b* connected to the access network device 120*b*. The core network device 110 may be connected to the access network device 120*a* or 120*b* through an NG interface, or may be connected to the access network device 120*a* or 120*b* through an N2 interface. The access network devices 120*a* and 120*b* may be access network devices in different forms, or may be access network devices in a same form. This is not limited in embodiments of this application. It should be understood that although the figure shows two access network devices that access the same core network device 110, one terminal device connected to the access network device 120*a*, and one terminal device connected to the access network device 120*b*, this should not constitute any limitation on this application. The core network device 110 may be connected to another number of access network devices, and the access network devices 120*a* and 120*b* may be separately connected to another number of terminal devices.

The access network device 120*b* shown in FIG. 1 includes a CU and a DU, for example, a CU 121, a DU 122*a*, and a DU 122*b* shown in the figure. The CU 121 and the DU 122*a*, and the CU 121 and the DU 122*b* may be separately connected through a standardized interface F1. It may be learned that one CU may be connected to one or more DUs, but one DU is connected to only one CU. A number of DUs that can be connected to one CU is not limited in this application.

In addition, although not shown in the figure, it may be understood that the access network device 120*b* may further include an active antenna unit (AAU).

The CU may implement some functions of the access network device, and the DU may implement some functions of the access network device. For example, the CU is responsible for processing a non-real-time protocol and a service, and implements functions at higher layers such as a radio resource control (RRC) layer, a packet data convergence layer protocol (PDCP) layer, and a service data adaptation protocol (SDAP) layer. The DU is responsible for processing a physical layer protocol and a real-time service, and implements functions at bottom layers such as a radio link control (RLC) layer, a medium access control (MAC) layer, and a physical (PHY) layer. The AAU may implement some physical layer processing functions, radio frequency processing, and a function related to an active antenna. Information at the RRC layer is finally changed to information at the PHY layer, or is changed from information at the PHY layer. Therefore, in this architecture, higher-layer signaling, for example, RRC layer signaling, may also be considered as being sent by the DU or sent by the DU and the AAU.

It may be understood that the network device may be a device including one or more of a CU node, a DU node, and an AAU node.

It should be noted that, for ease of understanding and description, in embodiments of this application, the CU is classified as a network device in an access network. In another definition, the CU may alternatively be classified as a network device in a core network. This is not limited in this application.

Figure 2:
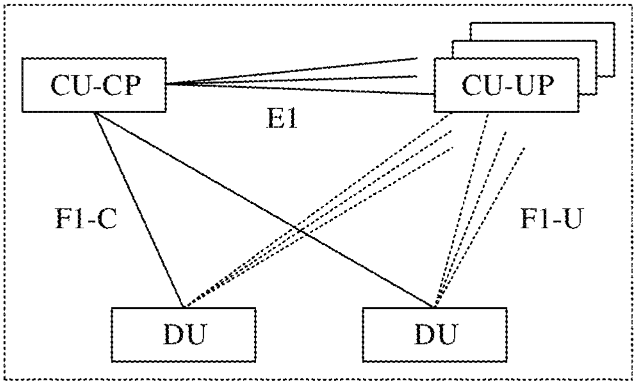
FIG. 2 is a schematic diagram of an access network device on which a CU and a DU are deployed according to an embodiment of this application.

FIG. 2 further shows an access network device on which a CU and a DU are deployed. As shown in FIG. 2, the CU may be divided into a CU-CP and a CU-UP based on different functions. The CU-CP and the CU-UP may be connected through a standardized interface E1. One CU-CP may be connected to a plurality of CU-UPs. The CU-CP includes an RRC entity and a PDCP entity, and the PDCP entity is a PDCP entity corresponding to a signaling resource bearer (SRB). The CU-UP includes an SDAP entity and a PDCP entity, and the PDCP entity is a PDCP entity corresponding to a data radio bearer (DRB).

One CU-CP may be connected to one or more DUs, and the CU-CP may be connected to each DU through an F1-C interface. One DU may be connected to one or more CU-UPs, and each CU-UP may be connected to the DU through an F1-U interface. It should be understood that both the F1-C interface and the F1-U interface belong to an F1 interface.

As described above, the CU-UP separated from the CU in the access network device may establish an EHC context for a terminal. Currently, the CU-CP may configure an EHC-related parameter for UE. However, the CU-UP still cannot determine, based on the parameter configured by the CU-CP, a number of EHC contexts that can be established for the terminal. Therefore, the CU-UP cannot establish a proper number of EHC contexts for the terminal.

In view of this, this application provides an information indication method. A CU-CP sends first information to a CU-UP, to indicate, by using the first information, a maximum number of EHC contexts that can be established by the CU-CP for UE, a first DRB of the UE, or a first protocol data unit (PDU) session of the UE in a downlink direction. The first DRB is any DRB that is of the UE and that is maintained by a UP, and the first PDU session is any PDU session that is of the UE and that is maintained by the UP. Therefore, the CU-UP may establish a proper number of EHC contexts for the UE, the first DRB, or the first PDU session in the downlink direction based on the first information.

The following describes in detail the information indication method provided in embodiments of this application with reference to the accompanying drawings.

For ease of understanding the following embodiments, the following description is first provided.

First, for the UE, one UE may establish one or more PDU sessions, and one PDU session may establish one or more DRBs. Any PDU session may have a requirement for establishing an EHC context, and any DRB may also have a requirement for establishing an EHC context. For ease of understanding and description, the following describes the method provided in embodiments of this application by using one UE as an example. In other words, one or more PDU sessions mentioned below are PDU sessions established by same UE, and one or more DRBs mentioned below are DRBs of the same UE. However, it should be understood that, for any UE, the method provided below may be implemented to establish an EHC context for the UE in the downlink direction.

As described above, the CU may be divided into a CU-CP and a CU-UP. One CU-CP may be connected to a plurality of CU-UPs, and the CU-UP may establish an EHC context for the UE. The plurality of CU-UPs connected to the CU-CP may maintain the EHC context of the UE from different dimensions. Each CU-UP may be responsible for maintaining an EHC context on one or more DRBs of the UE. Each CU-UP may also be responsible for maintaining an EHC context on one or more of PDU sessions of the UE. It should be understood that the following case may also exist: Some of the plurality of CU-UPs participate in maintenance of the EHC context of the UE, and another proportion of CU-UPs do not participate in maintenance of the EHC context of the UE.

Second, in embodiments of this application, words such as "first" and "second" are used only to distinguish and describe different things belonging to a same name category, and do not restrict a sequence or a number of the things. For example, "first information" and "second information" are only information with different content or purposes, and there is no time sequence relationship or priority relationship between the two. The first information may be one or more pieces of information, and the second information may also be one or more pieces of information.

Third, in embodiments of this application, "when" and "if" both mean that an apparatus performs corresponding processing in an objective situation, are not intended to limit time, do not require the apparatus to necessarily have a determining action during implementation, and do not mean any other limitation either.

Figure 3:
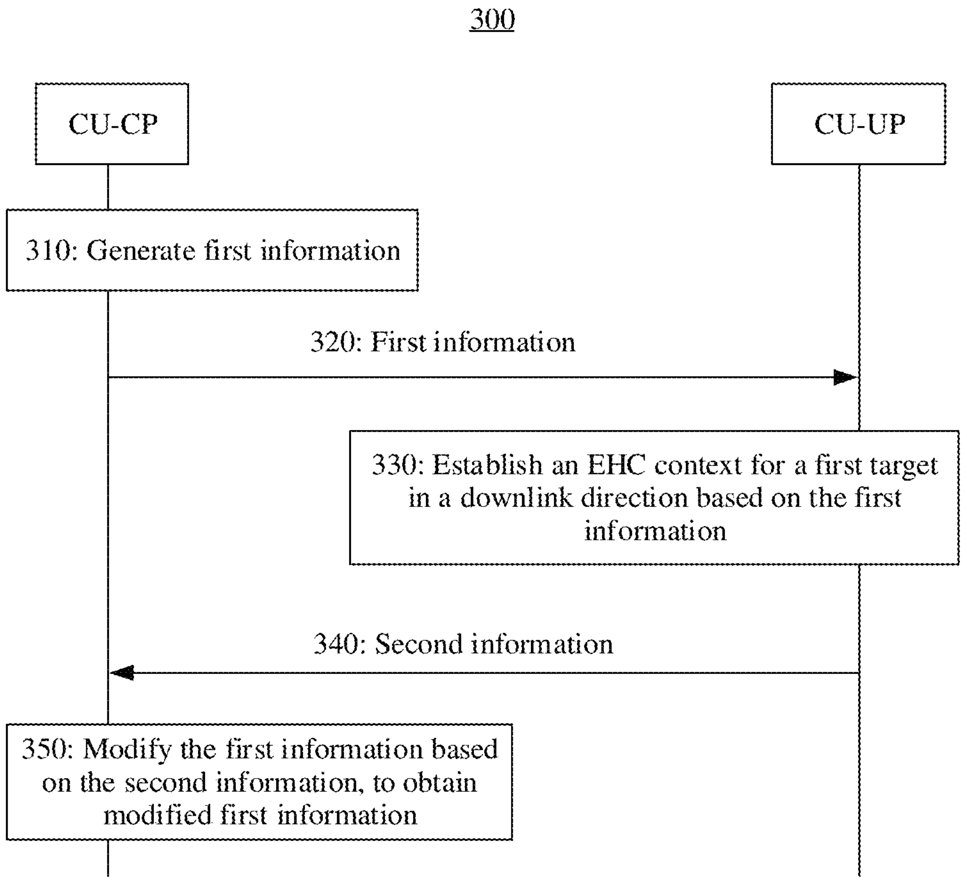
FIG. 3 is a schematic flowchart of an information indication method according to an embodiment of this application.

FIG. 3 is a schematic flowchart of an information indication method according to an embodiment of this application. A method 300 shown in FIG. 3 includes step 310 to step 350. The following describes in detail the steps in the method 300 shown in FIG. 3. It should be noted that in a specific implementation, some steps in FIG. 3 may be selected for implementation, or a sequence of the steps in the figure may be adjusted for implementation. This is not limited in this application. It should be understood that performing some steps in the figure, adjusting a sequence of the steps, or combining the steps for a specific implementation all fall within the protection scope of this application.

In step 310, a CP in a CU generates first information, where the first information indicates a maximum number of Ethernet header compression EHC contexts that can be established by a UP in the CU for a first target in a downlink direction.

The first target includes UE, a first DRB of the UE, or a first PDU session of the UE, the first DRB is any DRB that is of the UE and that is maintained by the UP, and the first PDU session is any PDU session that is of the UE and that is maintained by the UP.

When a plurality of UPs connected to the CP jointly maintain one UE, and each UP maintains at least one DRB of the UE, the first information generated by the CP in the CU may indicate a maximum number of EHC contexts that can be established by the UP in the CU for a first DRB of the UE in the downlink direction, where the first DRB is a DRB maintained by the UP. That is, the CP indicates, to a corresponding UP, a maximum number of EHC contexts that can be established in the downlink direction for each DRB that has a requirement for establishing an EHC context in the UE.

For example, the UE establishes a DRB 1, a DRB 2, and a DRB 3, and UPs connected to the CP include a UP 1, a UP 2, and a UP 3. EHC may be performed on service data served by the DRB 1, the DRB 2, and the DRB 3. Therefore, the UPs may establish EHC contexts for these DRBs for Ethernet header compression. In addition, the UP 1 maintains the DRB 1, the UP 2 maintains the DRB 2, and the UP 3 maintains the DRB 3. A maximum number, assigned by the CP to the UP, of EHC contexts that can be established for the UE in the downlink direction is 500. In this case, the CP in the CU may respectively generate a piece of first information for each UP, and may generate three pieces of first information in total. One piece of first information may indicate a maximum number, for example, 100, of EHC contexts that can be established by the UP 1 for the DRB 1 maintained by the UP 1 in the downlink direction. Another piece of first information may indicate a maximum number, for example, 250, of EHC contexts that can be established by the UP 2 for the DRB 2 maintained by the UP 2 in the downlink direction. Still another piece of first information may indicate a maximum number, for example, 150, of EHC contexts that can be established by the UP 3 for the DRB 3 maintained by the UP 3 in the downlink direction.

For another example, the UE establishes a DRB 1, a DRB 2, a DRB 3, a DRB 4, a DRB 5, and a DRB 6, and UPs connected to the CP include a UP 1, a UP 2, and a UP 3. EHC may be performed on service data served by the DRB 1, the DRB 2, the DRB 3, the DRB 4, the DRB 5, and the DRB 6. Therefore, the UPs may establish EHC contexts for these DRBs for Ethernet header compression. In addition, the UP 1 maintains the DRB 1 and the DRB 2, the UP 2 maintains the DRB 3, the DRB 4, and the DRB 5, and the UP 3 maintains the DRB 6. A maximum number, which may be assigned by the CP to the UP, of EHC contexts that can be established for the UE in the downlink direction is 500. In this case, the CP in the CU may generate one piece of first information for each UP, and may generate three pieces of first information in total. One piece of first information may indicate a maximum number, for example, 100, of EHC contexts that can be established by the UP 1 for the DRB 1 maintained by the UP 1 in the downlink direction, and a maximum number, for example 150, of EHC contexts that are established for the DRB 2 maintained by the UP 1. Another piece of first information may indicate a maximum number, for example, 50, of EHC contexts that can be established by the UP 2 for the DRB 3 maintained by the UP 2 in the downlink direction, a maximum number, for example, 60, EHC contexts that are established for the DRB 4 maintained by the UP 2, and a maximum number, for example, 60, EHC contexts that are established for the DRB 5 maintained by the UP 2. Still another piece of first information may indicate a maximum number, for example, 80, of EHC contexts that can be established by the UP 3 for the DRB 6 maintained by the UP 3 in the downlink direction.

When a plurality of UPs connected to the CP jointly maintain the UE, and each UP maintains at least one DRB of the UE, the first information generated by the CP in the CU may indicate a maximum number of EHC contexts that can be established by the UP in the CU for the UE in the downlink direction. That is, the CP indicates, to a corresponding UP, a total value of maximum numbers of EHC contexts that can be established in the downlink direction for at least one DRB maintained by the UP.

For example, the UE establishes a DRB 1, a DRB 2, a DRB 3, a DRB 4, a DRB 5, and a DRB 6, and UPs connected to the CP include a UP 1, a UP 2, and a UP 3. EHC may be performed on service data served by the DRB 1, the DRB 2, the DRB 3, the DRB 4, the DRB 5, and the DRB 6. Therefore, the UP may establish EHC contexts for these DRBs for Ethernet header compression. In addition, the UP 1 maintains the DRB 1 and the DRB 2, the UP 2 maintains the DRB 3, the DRB 4, and the DRB 5, and the UP 3 maintains the DRB 6. A maximum number, which may be assigned by the CP to the UP, of EHC contexts that can be established for the UE in the downlink direction is 500. In this case, the CP in the CU may generate one piece of first information for each UP, and may generate three pieces of first information in total. One piece of first information may indicate a total value of maximum numbers, for example, 150, of EHC contexts that can be established by the UP 1 for the DRB 1 and the DRB 2 that are maintained by the UP 1 in the downlink direction. Another piece of first information indicates a total value of maximum numbers, for example, 250, of EHC contexts that can be established by the UP 2 for the DRB 3, the DRB 4, and the DRB 5 that are maintained by the UP 2 in the downlink direction. Still another piece of first information indicates a maximum number, for example, 100, of EHC contexts that can be established by the UP 3 for the DRB 6 maintained by the UP 3 in the downlink direction. In this case, each UP may assign, based on the maximum number indicated by the CP in the first information, a number of EHC contexts that can be established in the downlink direction to each DRB maintained by the UP. For example, the UP 1 may flexibly assign, to each of the DRB 1 and the DRB 2, a number of EHC contexts that can be established in the downlink direction for each of the DRB 1 and the DRB 2.

When a plurality of UPs connected to the CP jointly maintain the UE, and each UP maintains at least one PDU session of the UE, the first information generated by the CP in the CU may indicate a maximum number of EHC contexts that can be established by the UP in the CU for the first PDU session of the UE in the downlink direction. The first PDU session is any PDU session of the UE maintained by the UP. That is, the CP indicates, to a corresponding UP, a maximum number of EHC contexts that can be established in the downlink direction for the PDU session maintained by the UP.

For example, the UE establishes a PDU session 1, a PDU session 2, and a PDU session 3, and UPs connected to the CP include a UP 1, a UP 2, and a UP 3. EHC may be performed on service data served by the PDU session 1, the PDU session 2, and the PDU session 3. Therefore, the UP may establish EHC contexts for DRBs corresponding to these PDU sessions for Ethernet header compression. In addition, the UP 1 maintains the PDU session 1, the UP 2 maintains the PDU session 2, and the UP 3 maintains the PDU session 3. A maximum number, which may be assigned by the CP to the UP, of EHC contexts that can be established for the UE in the downlink direction is 500. In this case, the CP in the CU may generate one piece of first information for each UP, and may generate three pieces of first information in total. One piece of first information indicates a maximum number, for example, 100, of EHC contexts that can be established by the UP 1 for the PDU session 1 maintained by the UP 1 in the downlink direction. Another piece of first information indicates a maximum number, for example, 200, of EHC contexts that can be established by the UP 2 for the PDU session 2 maintained by the UP 2 in the downlink direction. Still another piece of first information indicates a maximum number, for example, 200, of EHC contexts that can be established by the UP 3 for the PDU session 3 maintained by the UP 3 in the downlink direction. In this case, each UP assigns, based on the maximum number indicated by the CP in the first information, a number of EHC contexts that can be established in the downlink direction to each DRB maintained by the UP.

For another example, the UE establishes a PDU session 1, a PDU session 2, and a PDU session 3, and UPs connected to the CP include a UP 1, and a UP 2. Each of the PDU session 1, the PDU session 2, and the PDU session 3 has a requirement for establishing an EHC context. In addition, the UP 1 maintains the PDU session 1 and the PDU session 2, and the UP 2 maintains the PDU session 3. A maximum number, which may be assigned by the CP to the UP, of EHC contexts that can be established for the UE in the downlink direction is 500. In this case, the CP in the CU may generate one piece of first information for each UP, and may generate two pieces of first information in total. One piece of first information indicates a maximum number, for example, 200, of EHC contexts that can be established by the UP 1 for the PDU session 1 maintained by the UP 1 in the downlink direction, and a maximum number, for example 150, of EHC contexts that are established for the PDU session 2 maintained by the UP 1. Another piece of first information indicates a maximum number, for example, 150, of EHC contexts that can be established by the UP 2 for the PDU session 3 maintained by the UP 2 in the downlink direction. In this case, each UP also assigns, based on the maximum number indicated by the CP in the first information, a number of EHC contexts that can be established in the downlink direction to each DRB corresponding to a PDU session maintained by the UP.

It should be understood that the maximum number, indicated by the first information, of EHC contexts that can be established by the UP for a first target in the downlink direction is assigned based on a capability of the UE. When the UE maintains a plurality of DRBs or a plurality of PDU sessions, the maximum number of EHC contexts that can be established by the UP for the UE in the downlink direction may be determined based on a maximum number, assigned to each DRB or PDU session of the UE, of EHC contexts that can be established by the UP for each DRB or each PDU session in the downlink direction.

The maximum number, assigned by the CP to the UP, of EHC contexts that can be established for the UE in the downlink direction can meet the following conditions: A total value of a maximum number, assigned by the CP to the UE, of EHC contexts that can be established by the UE in an uplink direction plus a maximum number, assigned by the CP to the UE, of EHC contexts that can be established by the UP for the UE in the downlink direction is not greater than a maximum number of EHC contexts supported by the UE, or less than or equal to a maximum number of EHC contexts supported by the UE.

Correspondingly, the maximum number, indicated by the first information, of EHC contexts that can be established by the UP for the first target in the downlink direction should also be limited to the maximum number, assigned by the CP to the UP, of EHC contexts that can be established for the UE in the downlink direction.

In an implementation, the CP may first assign, to the UE, the maximum number of EHC contexts that can be established by the UE in the uplink direction, and then assign, to the UP, the maximum number of EHC contexts that can be established by the UP for the UE in the downlink direction. In this case, when the CP assigns, to the UE, the maximum number of EHC contexts that can be established by the UE in the uplink direction, the assigned maximum number is not greater than the maximum number of EHC contexts supported by the UE. Then, when the CP assigns, to the UE, the maximum number of EHC contexts that can be established by the UP for the UE in the downlink direction, the assigned maximum number is not greater than a number of remaining EHC contexts supported by the UE after the CP assigns, to the UE, the maximum number of EHC contexts that can be established by the UE in the uplink direction.

In another implementation, the CP may first assign, to the UE, the maximum number of EHC contexts that can be established by the UP for the UE in the downlink direction, and then assign, to the UE, the maximum number of EHC contexts that can be established by the UE in the uplink direction. In this case, when the CP assigns, to the UE, the maximum number of EHC contexts that can be established by the UP for the UE in the downlink direction, the assigned maximum number is not greater than the maximum number of EHC contexts supported by the UE. Then, when the CP assigns, to the UE, the maximum number of EHC contexts that can be established by the UE in the uplink direction, the assigned maximum number is not greater than a number of remaining EHC contexts supported by the UE after the CP assigns, to the UE, the maximum number of EHC contexts that can be established for the UE in the downlink direction.

For example, if the maximum number of EHC contexts supported by the UE is 500, the CP may first assign, to the UE, the maximum number of EHC contexts that can be established by the UE in the uplink direction, which may be any value within 500, for example, 350. Then, the CP assigns, to the UE, the maximum number of EHC contexts that can be established by the UP for the UE in the downlink direction, and correspondingly, the assigned maximum number may be not greater than the number of remaining EHC contexts supported by the UE, for example, may be less than or equal to 150. Correspondingly, a manner of first assigning, to the UE, the maximum number of EHC contexts that can be established by the UP for the UE in the downlink direction, and then assigning, to the UE, the maximum number of EHC contexts that can be established for the UE in the uplink direction is similar, and details are not described by using an example.

For a manner in which the CP assigns, to the UE, the maximum number of EHC contexts that can be established by the UP for the UE in the downlink direction, and then continues to assign the maximum number of EHC contexts to the first target maintained by each UP, refer to the foregoing example description.

Based on the capability of the UE, the CP determines the maximum number, which may be assigned to the UE, of EHC contexts that can be established by the UP for the UE in the downlink direction. The capability of the UE may specifically include the maximum number of EHC contexts that can be supported by the UE. Optionally, the CP receives third information, where the third information indicates the maximum number of EHC contexts supported by the UE.

For example, the third information is capability information of the UE. The capability information of the UE may indicate whether the UE supports establishment of an EHC context, and may further indicate the maximum number of EHC contexts supported by the UE. Alternatively, the capability information of the UE may directly indicate the maximum number of EHC contexts supported by the UE.

In an implementation, a network device may obtain the capability information of the UE from the UE. For example, the UE may actively or at a request of the network device report the capability information of the UE to the CP. When receiving the capability information of the UE, the CP may determine the maximum number of EHC contexts supported by the UE, and then perform corresponding assignment based on the maximum number, reported by the UE, of EHC contexts. In another implementation, a network device may obtain the capability information of the UE from another network device. For example, the CP may obtain, in a handover process of the UE, the capability information of the UE from a handover command sent by a source base station of the UE. The CP may determine, based on the capability information of the UE, the maximum number of EHC contexts supported by the UE, and then perform corresponding assignment based on the maximum number of EHC contexts.

In step 320, the CP sends the first information to the UP. Correspondingly, the UP receives the first information from the CP.

When the CP sends the first information to the UP, the first information may be carried in a plurality of manners. With reference to the technical specification (TS) 38.463, the following provides several examples of an IE used to carry the first information.

Optionally, the first information is carried in an EHC parameters IE.

When the first target indicated by the first information is a DRB, the first information is carried in the EHC parameters IE. For example, a new first IE or first parameter is introduced into the EHC parameters IE to indicate the first information. As shown in the following Table 1, the first parameter is newly introduced into an EHC Downlink IE of the EHC parameters IE to indicate the first information. The first parameter may be referred to as a maximum context identifier (CID) EHC-downlink (DL) (maxCID-EHC-DL) in the EHC parameters IE. A value in the "maxCID-EHC-DL" field may be a positive integer, and a value range may be, for example, 1 to 32767, indicating a maximum number of EHC contexts that can be established for the DRB in the downlink direction. It should be noted that the name of the first parameter is merely an example, but not a limitation.

TABLE 1

| Information element/ Group name (IE/group name) | Presence (presence) | Range (range) | Information element type and reference (IE type and reference) | Semantics description (semantics description) |
|---|---|---|---|---|
| "EHC Common" | Mandatory | | | |
| ">EHC-CID-Length" | Mandatory | | Enumerated {7 bits, 15 bits, . . .} | For details, refer to the description of "ehc-CID-Length" in TS 38.311[10] |
| "EHC Downlink" | Optional | | | |
| ">drb-ContinueEHC-DL" | Mandatory | | Enumerated {true, . . .} | For details, refer to the description of "drb-ContinueEHC-DL" in TS 38.331[10] |
| ">maxCID-EHC-DL" | Mandatory | | Integer (1 to 32767) | Maximum number of EHC contexts that can be established for a DRB in a downlink direction |

TABLE 1-continued

| Information element/ Group name (IE/group name) | Presence (presence) | Range (range) | Information element type and reference (IE type and reference) | Semantics description (semantics description) |
|---|---|---|---|---|
| "EHC Uplink" | Optional | | | |
| ">drb-ContinueEHC-UL" | Mandatory | | Enumerated {true, . . .} | For details, refer to the description of "drb-ContinueEHC-UL" in TS 38.331[10] |

When the first target indicated by the first information is UE, the first information is carried in the EHC parameters LE. For example, a new first LE or first parameter is introduced into the EHC parameters IE to indicate the first information. As shown in the following Table 2, the first parameter is newly introduced into an EHC Common LE of the EHC parameters LE to indicate the first information. The first parameter may be referred to as a maximum number (UE DL Maximum EHC CID Number) of downlink EHC context identifiers of the UE. A value in the "UE DL Maximum EHC CID Number" field may be a positive integer, and a value range may be, for example, 1 to 32767, indicating a maximum number of EHC contexts that can be established for the UE in the downlink direction. It should be noted that the name of the first parameter is merely an example, but not a limitation.

TABLE 2

| Information element/ Group name | Presence | Range | Information element type and reference | Semantics description |
|---|---|---|---|---|
| "EHC Common" | Mandatory | | | |
| ">EHC-CID-Length" | Mandatory | | Enumerated {7 bits, 15 bits, . . .} | For details, refer to the description of "ehc-CID-Length" in TS 38.311[10] |
| ">UE DL Maximum EHC CID Number" | Optional | | Integer (1 to 32767) | Maximum number of EHC contexts that can be established for UE in a downlink direction |
| "EHC Downlink" | Optional | | | |
| ">drb-ContinueEHC-DL" | Mandatory | | Enumerated {true, . . .} | For details, refer to the description of "drb-ContinueEHC-DL" in TS 38.311[10] |
| "EHC Uplink" | Optional | | | |
| ">drb-ContinueEHC-UL" | Mandatory | | Enumerated {true, . . .} | For details, refer to the description of "drb-ContinueEHC-UL" in TS 38.311[10] |

When the first target indicated by the first information is a PDU session, the first information is carried in the EHC parameters LE. For example, a new first LE or first parameter is introduced into the EHC parameters LE to indicate the first information. As shown in the following Table 3, the first parameter is newly introduced into an EHC Common LE of the EHC parameters IE to indicate the first information. The first parameter may be referred to as a maximum number (PDU session DL Maximum EHC CID Number) of downlink EHC context identifiers (CIDs) of the PDU session. A value in the "PDU session DL Maximum EHC CID Number" field may be a positive integer, and a value range may be, for example, 1 to 32767, indicating a maximum number of EHC contexts that can be established for the PDU session in the downlink direction. It should be noted that the name of the first parameter is merely an example, but not a limitation.

TABLE 3

| Information element/ Group name | Presence | Range | Information element type and reference | Semantics description |
|---|---|---|---|---|
| "EHC Common" | Mandatory | | | |
| ">EHC-CID-Length" | Mandatory | | Enumerated {7 bits, 15 bits, . . .} | For details, refer to the description of "ehc-CID-Length" in TS 38.331[10] |
| ">PDU Session DL Maximum EHC CID Number" | Optional | | Integer (1 to 32767) | Maximum number of EHC contexts that can be established by a UP for a PDU session in a downlink direction |
| "EHC Downlink" | Optional | | | |
| ">drb-ContinueEHC-DL" | Mandatory | | Enumerated {true, . . .} | For details, refer to the description of "drb-ContinueEHC-DL" in TS 38.331[10] |
| "EHC Uplink" | Optional | | | |
| ">drb-ContinueEHC-UL" | Mandatory | | Enumerated {true, . . .} | For details, refer to the description of "drb-ContinueEHC-UL" in TS 38.331[10] |

Optionally, the first target is a first PDU session of the UE, and the first information is carried in a to-be-established PDU session resource list LE.

When the first target is a PDU session of the UE, the first information may alternatively be carried in the to-be-established PDU session resource list. For example, a new first IE or first parameter is introduced into a PDU session resource list LE, to indicate the first information. As shown in the following Table 4, the first parameter is newly introduced into a PDU Session Resource To Setup Item information element of the PDU session resource list LE to indicate the first information. The first parameter may be referred to as a maximum number (PDU session DL Maximum EHC CID Number) of downlink EHC context identifiers of the PDU session. A value in the "PDU session DL Maximum EHC CID Number" field may be a positive integer greater than or equal to 0, and a value range may be, for example, 0 to 32767, indicating a maximum number of EHC contexts that can be established for the PDU session in the downlink direction. It should be noted that the name of the first parameter is merely an example, but not a limitation.

Optionally, the first target is UE, and the first information is carried in a to-be-established UE session resource list LE.

When the first target is the UE, the first information may alternatively be carried in the to-be-established UE session resource list LE. For example, a new first LE or first parameter is introduced into a UE session resource list IE, to indicate the first information. As shown in the following Table 5, the first parameter is newly introduced into the UE session resource list LE to indicate the first information. The first parameter may be referred to as a maximum number (UE DL Maximum EHC CID Number) of downlink EHC context identifiers of the user equipment. A value in the "UE DL Maximum EHC CID Number" field may be a positive integer greater than or equal to 0, and a value range may be, for example, 0 to 32767, indicating a maximum number of EHC contexts that can be established for the UE in the downlink direction. It should be noted that the name of the first parameter is merely an example, but not a limitation.

TABLE 4

| Information element/ Group name | Presence | Range | Information element type and reference | Semantics description | Criticality (criticality) | Assigned criticality (assigned criticality) |
|---|---|---|---|---|---|---|
| "PDU Session Resource To Setup Item" | | Maximum number of PDU session resources | | | | |
| ">PDU Session ID" | Mandatory | | 9.3.1.21 | | | |
| ">PDU Session Type" | Mandatory | | 9.3.1.22 | | | |
| ">S-NSSAI" | Mandatory | | 9.3.1.9 | | | |
| ">Security Indication" | Mandatory | | 9.3.1.23 | | | |
| . . . | | | | | | |
| ">PDU Session DL Maximum EHC CID Number" | Optional | | Integer (0 to 32767) | Maximum number of EHC contexts that can be established by a UP for a PDU session in a downlink direction | | |

TABLE 5

| Information element/ Group name | Presence | Range | Information element type and reference | Semantics description | Criticality | Assigned criticality |
|---|---|---|---|---|---|---|
| "Message Type" | Mandatory | | 9.3.1.1 | | Yes | Reject |
| "gNB-CU-CP UE E1AP ID" | Mandatory | | 9.3.1.4 | | Yes | Reject |
| "Security Information" | Mandatory | | 9.3.1.10 | | Yes | Reject |
| . . . | | | | | | |
| "UE DL Maximum EHC CID Number" | Optional | | Integer (0 to 32767) | Maximum number of EHC contexts that can be established by a UP for UE in a downlink direction | Yes | Reject/Ignore |

Optionally, when the CP sends the first information, the first information may be carried in a bearer context setup request) message, a bearer context modification request message, or a bearer context modification confirm message for sending.

In step 330, the UP establishes an EHC context for the first target in the downlink direction based on the first information.

A number of EHC contexts established by the UP for the first target in the downlink direction is not greater than the maximum number indicated by the first information.

When the first information received by the UP indicates the maximum number of EHC contexts that can be established by the UP in the CU for the DRB of the UE in the downlink direction, the UP establishes a proper number of EHC contexts for a corresponding DRB based on the indicated maximum number.

For example, the UP 1 maintains the DRB 1 of the UE, the UP 2 maintains the DRB 2 of the UE, and the UP 3 maintains the DRB 3 of the UE. The first information received by the UP 1 indicates that a maximum number of EHC contexts that can be established by the UP 1 for the DRB 1 maintained by the UP 1 in the downlink direction is 100. In this case, the UP 1 may establish a proper number of EHC contexts for the DRB 1 maintained by the UP 1 according to an actual requirement, and the number of EHC contexts established by the UP 1 for the DRB 1 is not greater than 100, for example, is 80 or 95. The first information received by the UP 2 indicates that a maximum number of EHC contexts that can be established by the UP 2 for the DRB 2 maintained by the UP 2 in the downlink direction is 250. In this case, the UP 2 may establish a proper number of EHC contexts for the DRB 2 maintained by the UP 2 according to an actual requirement, and the number of EHC contexts established by the UP 2 for the DRB 2 is not greater than 250, for example, is 250 or 200. The first information received by the UP 3 indicates that a maximum number of EHC contexts that can be established by the UP 3 for the DRB 3 maintained by the UP 3 in the downlink direction is 150. In this case, the UP 3 may establish a proper number of EHC contexts for the DRB 3 maintained by the UP 3 according to an actual requirement, and the number of EHC contexts established by the UP 3 for the DRB 3 is not greater than 150, for example, is 150 or 100.

For another example, the UP 1 maintains the DRB 1 and the DRB 2 of the UE, the UP 2 maintains the DRB 3, the DRB 4, and the DRB 5 of the UE, and the UP 3 maintains the DRB 6 of the UE. The first information received by the UP 1 indicates that a maximum number of EHC contexts that can be established by the UP 1 for the DRB 1 maintained by the UP 1 in the downlink direction is 100, and the maximum number of EHC contexts that can be established for the DRB 2 maintained by the UP 1 is 150. In this case, the UP 1 may establish a proper number of EHC contexts for the DRB 1 and the DRB 2 that are maintained by the UP 1 according to an actual requirement. A number of EHC contexts established by the UP 1 for the DRB 1 is not greater than 100, for example, is 100 or 80, and a number of EHC contexts established by the UP 1 for the DRB 2 is not greater than 150, for example, is 120 or 150. The first information received by the UP 2 indicates that a maximum number of EHC contexts that can be established by the UP 2 for the DRB 3 maintained by the UP 2 in the downlink direction is 50, a maximum number of EHC contexts that can be established for the DRB 4 maintained by the UP 2 is 60, and a maximum number of EHC contexts that can be established for the DRB 5 maintained by the UP 2 is 60. In this case, the UP 2 may establish a proper number of EHC contexts for the DRB 3, the DRB 4, and the DRB 5 that are maintained by the UP 2 according to an actual requirement. A number of EHC contexts established by the UP 2 for the DRB 3 is not greater than 50, for example, is 50 or 45, a number of EHC contexts established by the UP2 for the DRB 4 is not greater than 60, for example, is 55 or 60, and a number of EHC contexts established by the UP2 for the DRB 5 is not greater than 60, for example, is 30 or 60. The first information received by the UP 3 indicates that a maximum number of EHC contexts that can be established by the UP 3 for the DRB 6 in the downlink direction is 80. In this case, the UP 3 may establish, according to an actual requirement, a proper number of EHC contexts for the DRB 6 maintained by the UP 3, and the number of EHC contexts established by the UP 3 for the DRB 6 is not greater than 80, for example, is 79.

When the first information received by the UP indicates the maximum number of EHC contexts that can be established by the UP in the CU for the UE in the downlink direction, the UP establishes a proper number of EHC contexts for the DRB maintained by the UP based on the indicated maximum number.

For example, the UP 1 maintains the DRB 1 and the DRB 2 of the UE, the UP 2 maintains the DRB 3, the DRB 4, and the DRB 5 of the UE, and the UP 3 maintains the DRB 6 of the UE.

The first information received by the UP 1 indicates that a total value of maximum numbers of EHC contexts that can be established by the UP 1 for the DRB 1 and the DRB 2 that are of the UE and that are maintained by the UP 1 in the downlink direction is 150. In this case, the UP 1 may respectively assign, to each of the DRB 1 and the DRB 2 according to an actual requirement, a maximum number of EHC contexts that can be established. When the maximum number of EHC contexts that can be established is assigned to each of the DRB 1 and the DRB 2 according to the actual requirement, a total value of maximum numbers, assigned by the UP 1 to the DRB 1 and the DRB 2, of EHC contexts that can be established is not greater than the maximum number indicated by the first information. For example, the maximum number, which may be assigned to the DRB 1, of EHC contexts that can be established is 50, and the maximum number, assigned to the DRB 2, of EHC contexts that can be established is 100. Similarly, when the UP 1 actually establishes a number of EHC contexts for each of the DRB 1 and the DRB 2, a proper number of EHC contexts may be established for each of the DRB 1 and the DRB 2 according to an actual requirement. The number of EHC contexts established by the UP 1 for the DRB 1 is not greater than 50, and the number of EHC contexts established for the DRB 2 is not greater than 100.

The first information received by the UP 2 indicates that a total value of maximum numbers of EHC contexts that can be established by the UP 2 for the DRB 3, DRB 4, and the DRB that are maintained by the UP 2 in the downlink direction is 250. In this case, the UP 2 may respectively assign, to each of the DRB 3, DRB 4, and the DRB 5 according to an actual requirement, a maximum number of EHC contexts that can be established. When the maximum number of EHC contexts that can be established is assigned to each of the DRB 3, DRB 4, and DRB 5 according to the actual requirement, a total value of maximum numbers, assigned by the UP 2 to the DRB 3, DRB 4, and DRB 5, of EHC contexts that can be established is not greater than the maximum number indicated by the first information. For example, the maximum number, which may be assigned to the DRB 3, of EHC contexts that can be established is 50, the maximum number, assigned to the DRB 4, of EHC contexts that can be established is 120, and the maximum number, assigned to the DRB 5, of EHC contexts that can be established is 80. Similarly, when the UP 2 actually establishes a number of EHC contexts for each of the DRB 3, DRB 4, and the DRB 5, a proper number of EHC contexts may be established for each of the DRB 3, DRB 4, and DRB according to an actual requirement. The number of EHC contexts established by the UP 2 for the DRB 3 is not greater than 50, the number of EHC contexts established for the DRB 4 is not greater than 120, and the number of EHC contexts established for the DRB 5 is not greater than 80.

The first information received by the UP 3 indicates that a maximum number of EHC contexts that can be established by the UP 3 for the DRB 6 maintained by the UP 3 in the downlink direction is 100. In this case, the UP 3 may establish a proper number of EHC contexts for the DRB 6 maintained by the UP 3 according to an actual requirement, and the number of EHC contexts established by the UP 3 for the DRB 6 is not greater than 100, for example, is 95.

When the first information received by the UP indicates the maximum number of EHC contexts that can be established by the UP in the CU for the PDU session of the UE in the downlink direction, the UP establishes a proper number of EHC contexts for the DRB in the PDU session maintained by the UP based on the indicated maximum number.

For example, the UP 1 maintains the PDU session 1 of the UE, the UP 2 maintains the PDU session 2 of the UE, and the UP 3 maintains the PDU session 3 of the UE. The PDU session 1 is associated with the DRB 1 and the DRB 2, the PDU session 2 is associated with the DRB 3, the DRB 4, and the DRB 5, and the PDU session 3 is associated with the DRB 6.

The first information received by the UP 1 indicates that a maximum number of EHC contexts that can be established by the UP 1 for the PDU session 1 maintained by the UP 1 in the downlink direction is 100. In this case, the UP 1 may assign, to each of the DRB 1 and the DRB 2 according to an actual requirement, a maximum number of EHC contexts that can be established, provided that a total value of maximum numbers, assigned by the UP 1 to the DRB 1 and the DRB 2, of EHC contexts that can be established is not greater than the maximum number indicated by the first information. For example, the maximum number, which may be assigned by the UP 1 to the DRB 1, of EHC contexts that can be established is 45, and the maximum number, assigned to the DRB 2, of EHC contexts that can be established is 55. Similarly, when the UP 1 actually establishes a number of EHC contexts for each of the DRB 1 and the DRB 2, a proper number of EHC contexts may be established for each of the DRB 1 and the DRB 2 according to an actual requirement. The number of EHC contexts established by the UP 1 for the DRB 1 is not greater than 45, and the number of EHC contexts established for the DRB 2 is not greater than 55.

The first information received by the UP 2 indicates that a maximum number of EHC contexts that can be established by the UP 2 for the PDU session 2 maintained by the UP 2 in the downlink direction is 200. In this case, the UP 2 may respectively assign, to each of the DRB 3, the DRB 4, and the DRB 5 according to an actual requirement, a maximum number of EHC contexts that can be established, provided that a total value of maximum numbers, assigned by the UP 2 to the DRB 3, the DRB 4, and the DRB 5, of EHC contexts that can be established is not greater than the maximum number indicated by the first information. For example, the maximum number, which may be assigned by the UP 2 to the DRB 3, of EHC contexts that can be established is 100, the maximum number, assigned to the DRB 4, of EHC contexts that can be established is 60, and the maximum number, assigned to the DRB 5, of EHC contexts that can be established is 40. Similarly, when the UP 2 actually establishes an EHC context for each of the DRB 3, the DRB 4, and the DRB 5, a proper number of EHC contexts may be established for each of the DRB 3, the DRB 4, and the DRB 5 according to the actual requirement. Details are not described herein again.

The first information received by the UP 3 indicates that a maximum number of EHC contexts that can be established by the UP 3 for the PDU session 3 maintained by the UP 3 in the downlink direction is 200. In this case, the UP 3 may establish a proper number of EHC contexts for the DRB 6 according to an actual requirement, and the number of EHC contexts established by the UP 3 for the DRB 6 is not greater than 200, for example, is 200 or 150.

For another example, the UP 1 maintains the PDU session 1 and the PDU session 2 of the UE, and the UP 2 maintains the PDU session 3 of the UE. The PDU session 1 includes the DRB 1 and the DRB 2, the PDU session 2 includes the DRB 3, the DRB 4, and the DRB 5, and the PDU session 3 includes the DRB 6. The first information received by the UP 1 indicates that a maximum number of EHC contexts that can be established by the UP 1 for the PDU session 1 maintained by the UP 1 in the downlink direction is 150, and a maximum number of EHC contexts that can be established by the UP 1 for the PDU session 2 maintained by the UP 1 is 200. In this case, the UP 1 may assign, to each of the DRB 1 and the DRB 2 in the PDU session 1 according to an actual requirement, a number of EHC contexts that can be established, and may assign, to each of the DRB 3, DRB 4, and DRB 5 in the PDU session 2, a number of EHC contexts that can be established. When the UP 1 assigns, to each of the DRB 1 and the DRB 2 in the PDU session 1, the number of EHC contexts that can be established, a total value of the maximum numbers, assigned by the UP 1 to the DRB 1 and the DRB 2, of EHC contexts that can be established is not greater than the maximum number, indicated by the first information, of EHC contexts that can be established for the PDU session 1. For example, the maximum number, which may be assigned to the DRB 1, of EHC contexts that can be established is 50, and the maximum number, assigned to the DRB 2, of EHC contexts that can be established is 100. When the UP 1 assigns, to each of the DRB 3, the DRB 4, and the DRB 5 in the PDU session 2, the number of EHC contexts that can be established, a total value of the maximum numbers, assigned by the UP 1 to the DRB 3, the DRB 4, and the DRB 5, of EHC contexts that can be established, is not greater than the maximum number, indicated by the first information, of EHC contexts that can be established for the PDU session 2. For example, the maximum number, which may be assigned to the DRB 3, of EHC contexts that can be established is 50, the maximum number, assigned to the DRB 4, of EHC contexts that can be established is 100, and the maximum number, assigned to the DRB 5, of EHC contexts that can be established is 50. Then, the UP 1 establishes a proper number of EHC contexts for each of the DRB 1 and the DRB 2 according to an actual requirement, and establishes a proper number of EHC contexts for each of the DRB 3, the DRB 4, and the DRB 5 according to the actual requirement. A number of EHC contexts established for the DRB 1 is not greater than 50, a number of EHC contexts established for the DRB 2 is not greater than 100, a number of EHC contexts established for the DRB 3 is not greater than 50, a number of EHC contexts established for the DRB 4 is not greater than 100, and a number of EHC contexts established for the DRB 5 is not greater than 50.

The first information received by the UP 2 indicates that a maximum number of EHC contexts that can be established by the UP 2 for the PDU session 2 maintained by the UP 2 in the downlink direction is 150. In this case, the UP 2 may establish a proper number of EHC contexts for the DRB 6 according to an actual requirement, and the number of EHC contexts established by the UP 2 for the DRB 6 is not greater than 150, for example, 100.

In step 340, the UP sends second information to the CP, where the second information is used to request to modify a maximum number of EHC contexts that can be established for the first target in the downlink direction. Correspondingly, the CP receives the second information from the UP.

The second information indicates an expected value of the maximum number requested to be modified, or the second information is used to request to modify the maximum number to a larger value, or to modify the maximum number to a smaller value.

When the maximum number, indicated by the first information received by the UP, of EHC contexts that can be established by the UP for the first target in the downlink direction does not meet a requirement of the UP, the UP may send the second information to the CP, to request the CP to reassign, to the UP, a maximum number of EHC contexts that can be established for the first target in the downlink direction.

For example, the first information received by the UP 2 indicates that a maximum number of EHC contexts that can be established by the UP 2 for the first DRB of the UE in the downlink direction is 250. In this case, the UP 2 maintains establishment of an EHC context for the DRB 2 on the UE. If the maximum number 250, indicated by the first information, of EHC contexts does not meet a requirement of the UP 2, the UP 2 may send the second information to the CP, to directly request to modify an expected value, for example, 260, of the maximum number of EHC contexts that can be established for the DRB 2, or request to modify the maximum number to a larger value, or request to modify the maximum number to a smaller value.

For another example, the first information received by the UP 2 indicates that a maximum number of EHC contexts that can be established by the UP 2 for the UE in the downlink direction is 250. In this case, the UP 2 maintains establishment of an EHC context for each of the DRB 3, DRB 4, and DRB 5 on the UE. If the maximum number 250, indicated by the first information, of EHC contexts does not meet a requirement of the UP 2, the UP 2 may send the second information to the CP, to directly request to modify an expected value, for example, 255, of a total value of maximum numbers of EHC contexts that can be established for the DRB 3, DRB 4, and DRB 5, or request to modify the maximum number to a larger value, or request to modify the maximum number to a smaller value.

For another example, the first information received by the UP 2 indicates that a maximum number of EHC contexts that can be established by the UP 2 for the first PDU session of the UE in the downlink direction is 250. In this case, the UP 2 maintains establishment of an EHC context for the PDU session 2 of the UE. If the maximum number 250, indicated by the first information, of EHC contexts does not meet a requirement of the UP 2, the UP 2 may send the second information to the CP, to directly request to modify an expected value, for example, 275, of a total maximum number of EHC contexts that can be established for the PDU session 2, or request to modify the maximum number to a larger value, or request to modify the maximum number to a smaller value.

Optionally, during specific sending of the second information, the UP may carry the second information in a bearer context modification required message for sending.

In step 350, the CP modifies the first information based on the second information, to obtain modified first information.

After receiving the second information, the CP may not directly perform reassignment based on request, but first perform the following operation: If the second information received by the CP indicates to modify the maximum number to a smaller value, the CP correspondingly modifies the first information based on the second information directly to obtain modified first information, and sends the modified first information to a corresponding UP. If the second information received by the CP is used to request to modify the maximum number to a larger value, or the received second information is used to request to modify the expected value of the maximum number to a larger value, the CP first determines, based on a value of the modified maximum number, whether the total value of the maximum number, assigned by the CP to the UE, of EHC contexts that can be established by the UE in the uplink direction plus the maximum number, assigned by the CP to the UP, of EHC contexts that can be established by the UP for the UE in the downlink direction is greater than the maximum number of EHC contexts supported by the UE. If the value is greater than the maximum number of EHC contexts supported by the UE, the CP may correspondingly adjust the maximum number, assigned to another UP, of EHC contexts that can be established for the first target in the downlink direction.

For example, the first target is the first DRB of the UE. The UE includes the DRB 1, the DRB 2, and the DRB 3, and UPs connected to the CP include the UP 1, the UP 2, and the UP 3. The UP 1 maintains establishment of an EHC context on the DRB 1, the UP 2 maintains establishment of an EHC context on the DRB 2, and the UP 3 maintains establishment of an EHC context on the DRB 3. The maximum number of EHC contexts supported by the UE is 600. The maximum number, assigned by the CP to the UE, of EHC contexts that can be established by the UE in the uplink direction is 200. The maximum number, assigned by the CP to the UP, of EHC contexts that can be established by the UP for the UE in the downlink direction is 400. The maximum number, assigned by the CP to the UP 1, of EHC contexts that can be established for the DRB 1 in the downlink direction is 100. The maximum number, assigned to the UP 2, of EHC contexts that can be established for the DRB 2 in the downlink direction is 150. The maximum number, assigned to the UP 2, of EHC contexts that can be established for the DRB 2 in the downlink direction is 150. After receiving the first information, the UP 2 finds that the maximum number, indicated by the first information, of EHC contexts that can be established for the DRB 2 is 150 which does not meet a requirement of the UP 2. In this case, the UP 2 sends the second information to the CP, to request to modify the maximum number to 200. After receiving the second information, the CP determines that the number, assigned to the UP 2, of EHC contexts that can be established is 200. In this case, the maximum number, assigned by the CP to the UP, of EHC contexts that can be established for the UE in the downlink direction reaches 450. In this way, the maximum number of EHC contexts supported by the UE is exceeded. In this case, after modifying the maximum number, assigned to the UP 2, of EHC contexts that can be established in the downlink direction to 200, the CP may also reassign a maximum number of EHC contexts to each of the UP 1 and the UP 3. For example, the CP may modify the maximum number, assigned to the UP 1, of EHC contexts that can be established in the downlink direction to 80, and modify the maximum number, assigned to the UP 3, of EHC contexts that can be established in the downlink direction to 120, to resend the modified first information to the UP 1, the UP 2, and the UP 3, so as to re-indicate the maximum number of EHC contexts that can be established by each UP for the first target in the downlink direction.

It should be noted that step 340 and step 350 are optional steps. The UP may directly establish the EHC context for the first target in the downlink direction based on the first information sent by the CP.

It should be understood that when the first target is the UE or the first PDU session of the UE, the foregoing execution process is also met. Details are not described herein again.

Based on the foregoing solution, the CP indicates, to the UP by using the first information, the maximum number of EHC contexts that can be established by the UP for the UE, the DRB of the UE, or the PDU session of the UE in the downlink direction, so that the UP can establish a proper number of EHC contexts for the UE, the DRB of the UE, or the PDU session of the UE in the downlink direction based on the maximum number. This resolves a problem that a UP in an access network device in a split architecture cannot establish a proper number of EHC contexts for the UE because the UP does not know a capability of the UE.

Figure 4:
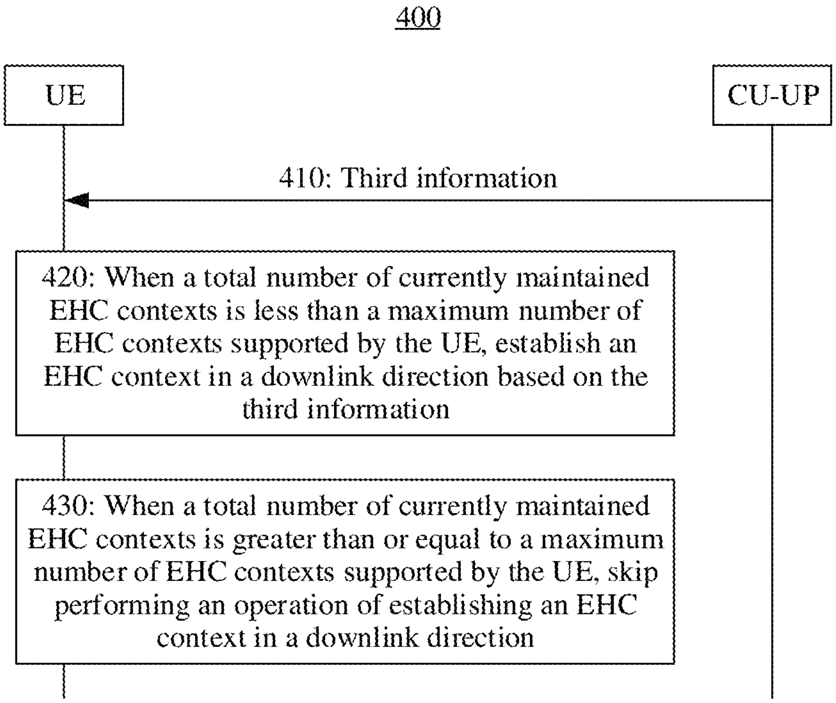
FIG. 4 is another schematic flowchart of an information indication method according to an embodiment of this application.

FIG. 4 is another schematic flowchart of an information indication method according to an embodiment of this application. The method 400 shown in FIG. 4 includes step 410 to step 430. The following describes in detail the steps in the method 400 shown in FIG. 4.

In step 410, a UP sends third information to UE, where the third information indicates the UE to establish an EHC context in a downlink direction.

When the UP establishes the EHC context in the downlink direction based on a service requirement, the UP may directly indicate the UE to establish the EHC context in the downlink direction.

In step 420, when a total number of currently maintained EHC contexts is less than a maximum number of EHC contexts supported by the UE, the UE establishes the EHC context in the downlink direction based on the third information.

For example, the maximum number of EHC contexts supported by the UE is 500. After receiving the third information, the UE determines that the total number of currently maintained EHC contexts is 498. In this case, the UE establishes another EHC context in the downlink direction.

Optionally, after the UE establishes the EHC context in the downlink direction, the UE may further send first feedback information to the UP, where the first feedback information indicates that the UE has established the EHC context in the downlink direction.

In step 430, when a total number of currently maintained EHC contexts is greater than or equal to a maximum number of EHC contexts supported by the UE, the UE does not perform the operation of establishing an EHC context in the downlink direction.

For example, the maximum number of EHC contexts supported by the UE is 500. After receiving the third information, the UE determines that the total number of currently maintained EHC contexts is 500, which has reached an upper limit of the capability of the UE. In this case, the UE does not perform the operation of establishing an EHC context in the downlink direction.

Optionally, when the UE determines that the total number of currently maintained EHC contexts has reached the upper limit of the capability, the UE may not send feedback information to the UP, or the UE may send second feedback information to the UP, where the second feedback information indicates that the total number of EHC contexts currently maintained by the UE has reached the upper limit of the capability.

When the UE does not send the feedback information to the UP, the UP may continuously send the third information to the UE at a preset time interval. If no feedback information of the UE is received within a preset time period, the UP determines that the total number of EHC contexts currently maintained by the UE has reached the upper limit of the capability of the UE, and no longer sends the third information to the UE. It should be understood that a person skilled in the art may set specific values of the preset time period and the preset time interval according to an actual requirement. This is not limited in this application.

When the UE sends the second feedback information to the UP, the UP may learn, based on the second feedback information, that the total number of EHC contexts currently maintained by the UE has reached the upper limit of the capability of the UE, and no longer send the third information to the UE.

For the UE, when the total number of EHC contexts currently maintained by the UE is greater than or equal to the maximum number of EHC contexts supported by the UE, even if a number of EHC contexts established by the UE for a DRB in an uplink direction does not reach a maximum number, assigned by the CP to the UE, of EHC contexts that can be established in the uplink direction, the UE does not establish a new EHC context, and may update and cover the EHC context that has been established in the uplink direction.

It should be understood that the UE may select, based on a magnitude relationship between the total number of currently maintained EHC contexts and the maximum number of contexts supported by the UE, one of step 420 and step 430 to perform, but not necessarily all of the steps.

Based on the foregoing solution, the UP sends third information to the UE, where the third information indicates that the UE establishes an EHC context in the downlink direction. The UE determines, by determining the magnitude relationship between the total value of EHC contexts currently maintained by the UE and the maximum number of EHC contexts supported by the UE, whether the EHC context can be established in the downlink direction. Therefore, this can prevent the total value of EHC contexts maintained by the UE from exceeding the limit of the capability of the UE, and avoid introduction of a new parameter between the CU and the UP.

The foregoing describes in detail the methods provided in embodiments of this application with reference to FIG. 3 and FIG. 4. The following describes in detail the apparatuses provided in embodiments of this application with reference to FIG. 5 to FIG. 8.

Figure 5:
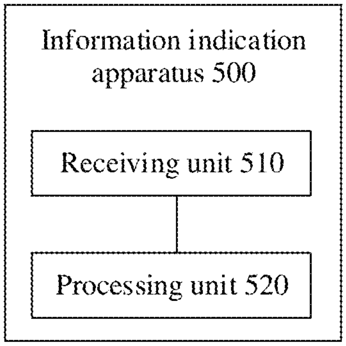
FIG. 5 is a schematic block diagram of an information indication apparatus according to an embodiment of this application.

FIG. 5 is a schematic block diagram of an information indication apparatus according to an embodiment of this application. As shown in FIG. 5, the information indication apparatus 500 may include a receiving unit 510 and a processing unit 520. Each unit in the apparatus 500 may be configured to implement a corresponding procedure performed by the CU-UP in the method 300 shown in FIG. 3. For example, the receiving unit 510 may be configured to perform step 320 in the method 300, and the processing unit 520 may be configured to perform step 330 and step 340 in the method 300.

Specifically, the receiving unit 510 may be configured to receive first information from a control plane CP, where the first information indicates a maximum number of Ethernet header compression EHC contexts that can be established for a first target in a downlink direction. The first target includes user equipment UE, a first data radio bearer DRB of the UE, or a first protocol data unit PDU session of the UE, the first DRB is a DRB maintained by a UP, and the first PDU session is a PDU session maintained by the UP. The processing unit 520 may be configured to establish an EHC context for the first target in the downlink direction based on the first information.

Optionally, a number of EHC contexts established by the UP for the first target in the downlink direction is not greater than the maximum number indicated by the first information.

Optionally, the first information is carried in an EHC parameters IE.

Optionally, the first target is a first PDU session of the UE, and the first information is carried in a to-be-established PDU session resource list IE.

Optionally, the first information is carried in a bearer context setup request message, a bearer context modification request message, or a bearer context modification confirm message.

Optionally, the processing unit 520 may be further configured to send second information to the CP, where the second information is used to request to modify the maximum number of EHC contexts that can be established for the first target in the downlink direction.

Optionally, the second information indicates an expected value of the maximum number requested to be modified, or the second information is used to request to modify the maximum number to a larger value, or to modify the maximum number to a smaller value.

Optionally, the second information is carried in a bearer context modification required message.

It should be understood that unit division in embodiments of this application is an example, and is merely logical function division. There may be another division manner during actual implementation. In addition, functional units in embodiments of this application may be integrated into one processor, or each of the units may exist alone physically, or two or more units are integrated into one unit. The integrated unit may be implemented in a form of hardware, or may be implemented in a form of a software functional unit.

Figure 6:
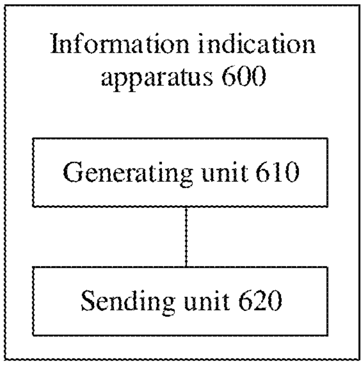
FIG. 6 is another schematic block diagram of an information indication apparatus according to an embodiment of this application.

FIG. 6 is a schematic block diagram of an information indication apparatus according to an embodiment of this application. As shown in FIG. 6, the information indication apparatus 600 may include a generating unit 610 and a sending unit 620. Each unit in the apparatus 600 may be configured to implement a corresponding procedure performed by the CU-CP in the method 300 shown in FIG. 3. For example, the generating unit 610 may be configured to perform step 310, step 340, and step 350 in the method 300, and the sending unit 620 may be configured to perform step 320 in the method 300.

Specifically, the generating unit 610 may be configured to generate first information, where the first information indicates a maximum number of Ethernet header compression EHC contexts that can be established for a first target in a downlink direction. The first target includes user equipment UE, a first data radio bearer DRB of the UE, or a first protocol data unit PDU session of the UE, the first DRB is a DRB maintained by a UP, and the first PDU session is a PDU session maintained by the UP. The sending unit 620 may be configured to send the first information to the UP.

Optionally, a total value of a maximum number, assigned by the generating unit 610 to the UE, of EHC contexts that can be established by the UE in an uplink direction plus a maximum number, assigned by the CP to a UP, of EHC contexts that can be established by the UP for the UE in the downlink direction is not greater than a maximum number of EHC contexts supported by the UE.

Optionally, the first information is carried in an EHC parameters IE.

Optionally, the first target is a first PDU session of the UE, and the first information is carried in a to-be-established PDU session resource list IE.

Optionally, the first information is carried in a bearer context setup request message, a bearer context modification request message, or a bearer context modification confirm message.

Optionally, the generating unit 610 may be further configured to: receive second information from the UP, where the second information is used to request to modify the maximum number of EHC contexts that can be established for the first target in the downlink direction; and modify the first information based on the second information.

Optionally, the second information indicates an expected value of the maximum number requested to be modified, or the second information is used to request to modify the maximum number to a larger value, or to modify the maximum number to a smaller value.

Optionally, the second information is carried in a bearer context modification required message.

Optionally, the generating unit 610 may be further configured to receive third information, where the third information indicates the maximum number of EHC contexts supported by the UE.

It should be understood that unit division in embodiments of this application is an example, and is merely logical function division. There may be another division manner during actual implementation. In addition, functional units in embodiments of this application may be integrated into one processor, or each of the units may exist alone physically, or two or more units are integrated into one unit. The integrated unit may be implemented in a form of hardware, or may be implemented in a form of a software functional unit.

Figure 7:
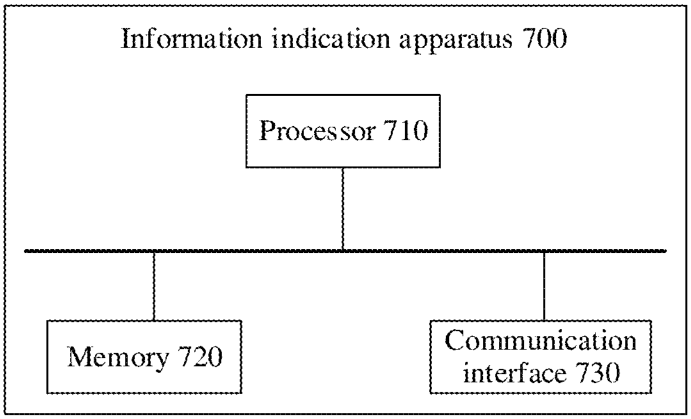
FIG. 7 is another schematic block diagram of an information indication apparatus according to an embodiment of this application.

FIG. 7 is another schematic block diagram of an information indication apparatus according to an embodiment of this application. The information indication apparatus 700 may be configured to implement a function of the CU-UP in the foregoing method. The information indication apparatus 700 may be a chip system. In this embodiment of this application, the chip system may include a chip, or may include a chip and another discrete component.

As shown in FIG. 7, the apparatus 700 may include at least one processor 710, configured to implement a function of the CU-UP in the method provided in this embodiment of this application.

For example, when the apparatus 700 is configured to implement the function of the CU-UP in the method provided in this embodiment of this application, the processor 710 may be configured to: receive first information from the CP, where the first information indicates a maximum number of Ethernet header compression EHC contexts that can be established for a first target in a downlink direction, and the first target includes: user equipment UE, a first data radio bearer DRB of the UE, or a first protocol data unit PDU session of the UE, where the first DRB is a DRB maintained by the UP, and the first PDU session is a PDU session maintained by the UP; and establish an EHC context for the first target in a downlink direction based on the first information. For details, refer to detailed description in the method example. Details are not described herein again.

The apparatus 700 may further include at least one memory 720, configured to store program instructions and/or data. The memory 720 is coupled to the processor 710. The coupling in this embodiment of this application may be an indirect coupling or a communication connection between apparatuses, units, or modules in an electrical form, a mechanical form, or another form, and is used for information exchange between the apparatuses, the units, or the modules. The processor 710 may cooperate with the memory 720. The processor 710 may execute the program instructions stored in the memory 720. At least one of the at least one memory may be included in the processor.

The apparatus 700 may further include a communication interface 730, configured to communicate with another device through a transmission medium, so that the apparatus 700 may communicate with the another device. For example, when the apparatus 700 is configured to implement the functions of the CU-UP in the method provided in embodiments of this application, the another device may be the CU-CP. The communication interface 730 may be, for example, a transceiver, an interface, a bus, a circuit, or an apparatus that can implement a transceiver function. The processor 710 may receive and send data and/or information through the communication interface 730, and is configured to implement the method performed by the CU-UP in the embodiment corresponding to FIG. 3.

A specific connection medium among the processor 710, the memory 720, and the communication interface 730 is not limited in this embodiment of this application. In this embodiment of this application, in FIG. 7, the processor 710, the memory 720, and the communication interface 730 are connected through a bus. The bus is represented by a bold line in FIG. 7, and a connection manner between other components is merely described as an example, and is not limited thereto. The bus may be classified into an address bus, a data bus, a control bus, and the like. For ease of representation, only one bold line is used for representation in FIG. 7, but this does not mean that there is only one bus or only one type of bus.

Figure 8:
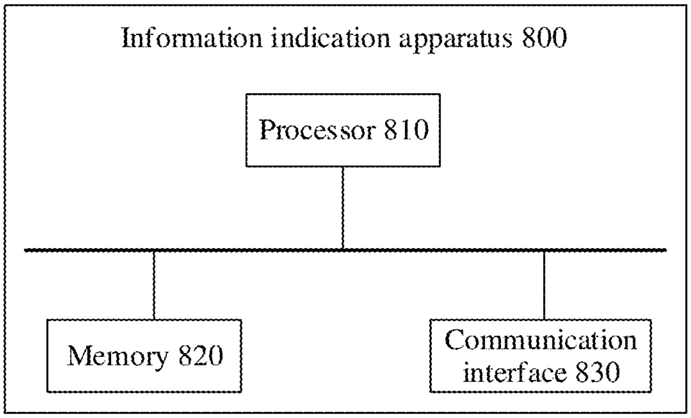
FIG. 8 is another schematic block diagram of an information indication apparatus according to an embodiment of this application.

FIG. 8 is another schematic block diagram of an information indication apparatus according to an embodiment of this application. The information indication apparatus 800 may be configured to implement a function of the CU-CP in the foregoing method. The information indication apparatus 800 may be a chip system. In this embodiment of this application, the chip system may include a chip, or may include a chip and another discrete component.

As shown in FIG. 8, the apparatus 800 may include at least one processor 810, configured to implement a function of the CU-CP in the method provided in this embodiment of this application.

For example, when the apparatus 800 is configured to implement the function of the CU-CP in the method provided in this embodiment of this application, the processor 810 may be configured to: generate first information, where the first information indicates a maximum number of Ethernet header compression EHC contexts that can be established for a first target in a downlink direction, and the first target includes: user equipment UE, a first data radio bearer DRB of the UE, or a first protocol data unit PDU session of the UE, where the first DRB is a DRB maintained by the UP, and the first PDU session is a PDU session maintained by the UP; and send the first information to the UP. For details, refer to detailed description in the method example. Details are not described herein again.

The apparatus 800 may further include at least one memory 820, configured to store program instructions and/or data. The memory 820 is coupled to the processor 810. The coupling in this embodiment of this application may be an indirect coupling or a communication connection between apparatuses, units, or modules in an electrical form, a mechanical form, or another form, and is used for information exchange between the apparatuses, the units, or the modules. The processor 810 may cooperate with the memory 820. The processor 810 may execute the program instructions stored in the memory 820. At least one of the at least one memory may be included in the processor.

The apparatus 800 may further include a communication interface 830, configured to communicate with another device through a transmission medium, so that the apparatus 800 may communicate with the another device. For example, when the apparatus 800 is configured to implement the functions of the CU-CP in the method provided in embodiments of this application, the another device may be the CU-UP. The communication interface 830 may be, for example, a transceiver, an interface, a bus, a circuit, or an apparatus that can implement a transceiver function. The processor 810 may receive and send data and/or information through the communication interface 830, and is configured to implement the method performed by the CU-CP in the embodiment corresponding to FIG. 3.

A specific connection medium among the processor 810, the memory 820, and the communication interface 830 is not limited in this embodiment of this application. In this embodiment of this application, in FIG. 8, the processor 810, the memory 820, and the communication interface 830 are connected through a bus. The bus is represented by a bold line in FIG. 8, and a connection manner between other components is merely described as an example, and is not limited thereto. The bus may be classified into an address bus, a data bus, a control bus, and the like. For ease of representation, only one bold line is for representation in FIG. 8, but this does not mean that there is only one bus or only one type of bus.

It should be understood that, the processor in embodiments of this application may be an integrated circuit chip, and has a signal processing capability. In an implementation process, steps in the foregoing method embodiments can be implemented by using a hardware integrated logical circuit in the processor, or by using instructions in a form of software. The processor may be a general purpose processor, a digital signal processor (DSP), an application-specific integrated circuit (ASIC), a field programmable gate array (FPGA), or another programmable logic device, a discrete gate or a transistor logic device, or a discrete hardware component, and may implement or perform the methods, steps, and logical block diagrams disclosed in embodiments of this application. The general-purpose processor may be a microprocessor, or the processor may be any conventional processor or the like. Steps of the methods disclosed with reference to embodiments of this application may be directly executed and accomplished by a hardware decoding processor, or may be executed and accomplished by using a combination of hardware and software modules in the decoding processor. A software module may be located in a mature storage medium in the art, for example, a random access memory, a flash memory, a read-only memory, a programmable read-only memory, an electrically erasable programmable memory, or a register. The storage medium is located in the memory, and the processor reads information in the memory and completes the steps in the foregoing methods in combination with hardware of the processor.

It may be understood that the memory in embodiments of this application may be a volatile memory or a nonvolatile memory, or may include a volatile memory and a nonvolatile memory. The nonvolatile memory may be a read-only memory (ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (RAM), used as an external cache. By way of example but not limitative description, many forms of RAMs may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus dynamic random access memory (direct rambus RAM, DR RAM). It should be noted that the memory of the systems and methods described in this specification includes but is not limited to these and any memory of another proper type.

This application further provides an information indication system. The system includes the foregoing CU-UP and CU-CP.

This application further provides a computer program product. The computer program product includes a computer program (which may also be referred to as code or instructions). When the computer program is run, a computer is enabled to perform the method performed by the CU-CP or the method performed by the CU-UP in the embodiment shown in FIG. 3, or the computer is enabled to perform the method performed by the UE or the method performed by the CU-UP in the embodiment shown in FIG. 4.

This application further provides a computer-readable storage medium. The computer-readable storage medium stores a computer program (which may also be referred to as code or instructions). When the computer program is run, the computer is enabled to perform the method performed by the CU-CP or the method performed by the CU-UP in the embodiment shown in FIG. 3, or the computer is enabled to perform the method performed by the UE or the method performed by the CU-UP in the embodiment shown in FIG. 4.

The terms such as "unit" and "module" used in this specification may indicate computer-related entities, hardware, firmware, combinations of hardware and software, software, or software being executed.

A person of ordinary skill in the art may be aware that various illustrative logical blocks and steps described with reference to embodiments disclosed in this specification can be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application. In the several embodiments provided in this application, it should be understood that the disclosed apparatus, device, and method may be implemented in other manners. For example, the described apparatus embodiment is merely an example. For example, division into the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of this application may be integrated into one processing unit, each of the units may exist alone physically, or two or more units are integrated into one unit.

In the foregoing embodiments, all or some of the functions of the function units may be implemented by using software, hardware, firmware, or any combination thereof. When software is used to implement the embodiments, all or a part of the embodiments may be implemented in a form of a computer program product. The computer program product includes one or more computer instructions (programs). When the computer program instructions (programs) are loaded and executed on a computer, the procedures or functions according to embodiments of this application are all or partially generated. The computer may be a general-purpose computer, a dedicated computer, a computer network, or other programmable apparatuses. The computer instructions may be stored in a computer-readable storage medium, or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or may be a data storage device, for example, a server or a data center that integrates one or more usable media. The usable medium may be a magnetic medium (for example, a floppy disk, a hard disk, or a magnetic tape), an optical medium (for example, a digital video disc (DVD)), a semiconductor medium (for example, a solid state drive (SSD)), or the like.

When functions are implemented in the form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, a network device or the like) to perform all or some of the steps of the methods described in embodiments of this application. The foregoing storage medium includes any medium that can store program code, for example, a USB flash drive, a removable hard disk, a ROM, a RAM, a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An information indication method, comprising:

receiving, by a user plane (UP) in a central unit (CU), first information from a control plane (CP), wherein the first information indicates a maximum number of Ethernet header compression (EHC) contexts establishable for a first data radio bearer (DRB) of user equipment (UE) in a downlink direction, wherein the first DRB is a DRB maintained by the UP;

establishing, by the UP, one or more EHC contexts for the first DRB in the downlink direction based on the first information; and sending, by the UP, second information to the CP, wherein the second information requests to modify the maximum number of EHC contexts establishable for the first DRB in the downlink direction, wherein the UP, the CP and the CU are configured by one or more processors.

2. The method according to claim 1, wherein a number of the one or more EHC contexts established by the UP for the first DRB in the downlink direction is not greater than the maximum number indicated by the first information.

3. The method according to claim 1, wherein the first information is carried in an EHC parameters information element (IE).

4. The method according to claim 1, wherein the first information is carried in a bearer context setup request message, a bearer context modification request message, or a bearer context modification confirm message.

5. An information indication method, comprising:

generating, by a control plane (CP) in a central unit (CU), first information, wherein the first information indicates a maximum number of Ethernet header compression (EHC) contexts establishable for a first data radio bearer (DRB) of user equipment (UE) in a downlink direction, wherein the first DRB is a DRB maintained by a user plane (UP);

sending, by the CP, the first information to the UP;

receiving, by the CP, second information from the UP, wherein the second information requests to modify the maximum number of EHC contexts establishable for the first DRB in the downlink direction; and modifying, by the CP, the first information based on the second information, wherein the UP, the CP and the CU are configured by one or more processors.

6. The method according to claim 5, wherein a total value of a maximum number, assigned by the CP to the UE, of EHC contexts establishable by the UE in an uplink direction plus a maximum number, assigned by the CP to the UE, of EHC contexts establishable for the UE in the downlink direction is not greater than a maximum number of EHC contexts supported by the UE.

7. The method according to claim 5, wherein the first information is carried in an EHC parameters information element (IE).

8. The method according to claim 5, wherein the first information is carried in a bearer context setup request message, a bearer context modification request message, or a bearer context modification confirm message.

9. An information indication apparatus, comprising:

at least one processor; and a memory coupled to the at least one processor and configured to store instructions executable by the at least one processor to instruct the apparatus to:

receive first information from a control plane (CP) in a central unit (CU), wherein the first information indicates a maximum number of Ethernet header compression (EHC) contexts establishable for a first data radio bearer (DRB) of user equipment (UE) in a downlink direction, wherein the first DRB is a DRB maintained by the apparatus;

establish one or more EHC contexts for the first DRB in the downlink direction based on the first information; and send second information to the CP, wherein the second information requests to modify the maximum number of EHC contexts establishable for the first DRB in the downlink direction, wherein the CP and the CU are configured by one or more processors.

10. The information indication apparatus according to claim 9, wherein a number of the one or more EHC contexts established by the at least one processor for the first DRB in the downlink direction is not greater than the maximum number indicated by the first information.

11. The information indication apparatus according to claim 9, wherein the first information is carried in an EHC parameters information element (IE).

12. The information indication apparatus according to claim 9, wherein the first information is carried in a bearer context setup request message, a bearer context modification request message, or a bearer context modification confirm message.

13. An information indication apparatus, comprising:

at least one processor; and a memory coupled to the at least one processor and configured to store instructions executable by the at least one processor to instruct the apparatus to:

generate first information, wherein the first information indicates a maximum number of Ethernet header compression (EHC) contexts establishable for a first data radio bearer (DRB) of user equipment (UE) in a downlink direction, wherein the first DRB is a DRB maintained by a user plane (UP) in a central unit (CU);

send the first information to the UP;

receive second information from the UP, wherein the second information requests to modify the maximum number of EHC contexts establishable for the first DRB in the downlink direction; and modify the first information based on the second information, wherein the UP and the CU are configured by one or more processors.

14. The information indication apparatus according to claim 13, wherein a total value of a maximum number, assigned by the apparatus to the UE, of EHC contexts establishable by the UE in an uplink direction plus a maximum number, assigned by the apparatus to the UE, of EHC contexts establishable for the UE in the downlink direction is not greater than a maximum number of EHC contexts supported by the UE.

15. The information indication apparatus according to claim 13, wherein the first information is carried in an EHC parameters information element (IE).

16. The information indication apparatus according to claim 13, wherein the first information is carried in a bearer context setup request message, a bearer context modification request message, or a bearer context modification confirm message.

* * * * *